United States Patent [19]

Okamura et al.

[11] 4,384,023
[45] May 17, 1983

[54] POROUS POLYETHYLENE FILM

[75] Inventors: Kiyonobu Okamura; Shindo Mizuo; Osamu Fukunaga, all of Otake, Japan

[73] Assignee: Mitsubishi Rayon Company, Limited, Tokyo, Japan

[21] Appl. No.: 336,216

[22] Filed: Dec. 31, 1981

[30] Foreign Application Priority Data

Jan. 16, 1981 [JP] Japan .................................. 56-4844

[51] Int. Cl.³ ........................ B32B 3/26; D01D 5/12; D01F 11/00
[52] U.S. Cl. .................................... 428/338; 156/229; 264/41; 264/210.7; 428/523; 428/910
[58] Field of Search ..................... 156/229; 264/210.7; 264/41; 428/338, 523, 910

[56] References Cited

U.S. PATENT DOCUMENTS 3,679,538 7/1972 Druin et al. ...................... 428/315.7
3,932,682 1/1976 Loft et al. ............................ 428/910
3,969,562 7/1976 Suzuki .................................. 428/910

*Primary Examiner*—William J. Van Balen
*Attorney, Agent, or Firm*—Ladas & Parry

[57] ABSTRACT

A porous polyethylene film was obtained which is characterized in that micropores are contiguous with one another from one surface to the other surface of the film to constitute a laminar structure, and said micropores assume the form of strips being composed of microfibrils that are arrayed in a direction in which the film is stretched and nodular portions that are coupled to said microfibrils nearly at right angles thereto, wherein the micropores have an average pore diameter over a range of 0.05 to 2 microns as measured using a mercury porosimeter, said film has a porosity over a range of 30 to 90%, and an elastic recovery factor from the 50% stretching ratio is less than 50%.

5 Claims, 2 Drawing Figures

POROUS POLYETHYLENE FILM

The present invention relates to a porous polyethylene film.

It is known that polyethylene can be molded into a porous film having fine pores that penetrate through the film. U.S. Pat. No. 3,679,538 teaches that polyethylene having a density of 0.96 g/cm$^3$ and an MI value of 0.7 can be molded into a flat film having holes through the film. According to this U.S. patent, the molten polyethylene is extruded from a T-die at a temperature range of from 175° to 225° C., quickly quenched and is stretched to form a film having fine pores that penetrate the film. According to this U.S. patent, the polyethylene is melt-extruded to prepare a film followed by the heat treatment, stretching and thermosetting, to obtain a fine porous film having a reduced bulk specific gravity as compared with the corresponding polymer film without open cellular construction, i.e., to obtain a fine porous film having a porosity of 34 to 41%, an average pore diameter of 100 to 5000 angstroms, i.e., 0.01 to 0.5 micron as measured by the mercury porosimeter method, and an elastic recovery factor from the 50% stretching ratio of 60 to 85%. Further, according to this U.S. patent which relies upon the melt-molding method and the stretching method without using solvent, it is considered that the process can be carried out very ideally without losses when it is performed on an industrial scale, making it possible to provide porous films containing few impurities and at reduced cost. However, the porous film obtained by the above U.S. patent has a limited range of pore diameters and this range is for rather small diameters or limited range of porosity, and has a poor ability to relax the stress, i.e., it has a large elastic recovery factor, and finds very restricted range of applications.

Although porous films composed of polyethylene can be prepared by various processes as is apparent from the above-mentioned prior art, there has not hitherto been available a method of producing a film of polyethylene having a small elastic recovery factor, an average pore diameter of greater than 0.5 micron and a porosity of greater than 41% by melt-molding the polyethylene without using solvent or plasticizer.

The inventors of the present invention have therefore conducted considerable study with regard to developing a polyethylene porous film which has an average porous diameter and a porosity that are greater than those of the conventional films, which has a sharp distribution of pore diameters, which has an excellent filtering efficiency and an excellent microporous laminer structure, and which is capable of quickly relaxing the stress, without using solvent or plasticizer, and have now developed the present film and a method for its production.

According to the invention there is provided a porous polyethylene film characterized in that micropores are contiguous with one another from one surface to the other surface of the film to constitute a laminar structure, and said micropores being formed in strips composed of microfibrils that are arrayed in a direction along the length of the film and nodular portions that are coupled to said microfibrils substantially at right angles thereto, wherein the micropores have an average pore diameter over a range of 0.05 to 2 microns as measured using a mercury porosimeter, said film has a porosity over a range of 30 to 90%, and an elastic recovery factor from the 50% stretching ratio is smaller than 50%.

Figure 1:
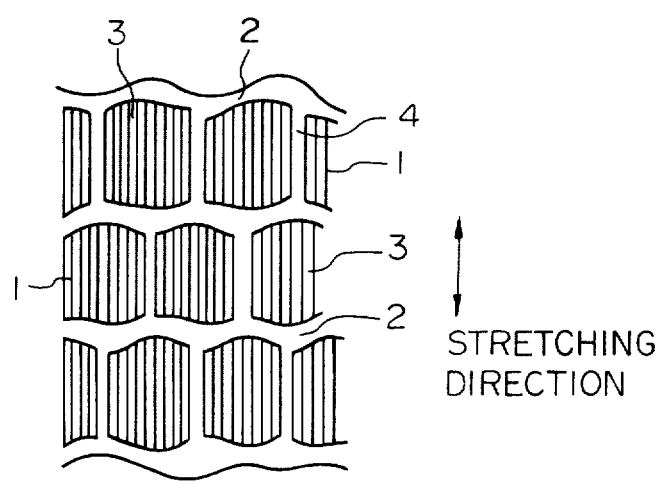
FIG. 1 is a schematic diagram illustrating a microporous laminar structure of a porous polyethylene film of the present invention.

In the drawings:
1 represent microfibrils;
2 represent nodular portions;
3 represents micropores; and
4 represents an aggregate of microfibrils.

Thus, the gist of the present invention resides in a porous polyethylene film characterized in that micropores are contiguous with one another from one surface to the other surface of the film to constitute a laminar structure, and said micropores being formed by strips composed of microfibrils that are arrayed in along the length of the film that is the direction in which the film is stretched during manufacture and nodular portions that are coupled to said microfibrils nearly at right angles thereto i.e. across the width of the film, wherein the micropores have an average pore diameter over a range of 0.05 to 2 microns as measured using a mercury porosimeter, said film has a porosity over a range of 30 to 90%, and an elastic recovery factor from the 50% stretching ratio is smaller than 50% and, preferably smaller than 30%.

The porous polyethylene film of the present invention has a porous surface area which is usually smaller than 30 m$^2$/cm$^3$ and, in many cases, smaller than 20 m$^2$/cm$^3$, and further has an elastic recovery factor from the 50% stretching ratio of smaller than 50% and, in many cases, smaller than 30%. The above film of the present invention is quite different from the porous film disclosed in U.S. Pat. No. 3,679,538 which has an elastic recovery factor from the 50% stretching ratio of as great as 60 to 85% and a porous surface area of at least greater than 30 m$^2$/cm$^3$.

The porous polyethylene film of the present invention having an elastic recovery factor of smaller than 50% and, in many cases, smaller than 30%, features very good stability in shapes when it is employed for a variety of apparatus even after they are preserved or used for extended periods of time. Namely, when the conventional porous polyethylene film having an elastic recovery factor of greater than 50% and which little relaxes the stress is molded into a module, there develop difficulties not only with regard to molding the film but also in that the stress of the film is exerted on the module or on the support members in the module or on the adhered portions, giving rise to the occurrence of deformation in the support members or causing the adhered portions to be peeled off. On the other hand, when the elastic recovery factor is smaller than 50% and, in many cases, smaller than 30% as in the present invention, the film quickly relaxes the stress; i.e. the module or the support member is not deformed by the stress of the film and the adhered portions are not peeled off.

Another feature of the present invention is to provide a polyethylene film having pore diameters of from 0.5 to 2.0 microns.

Figure 2:
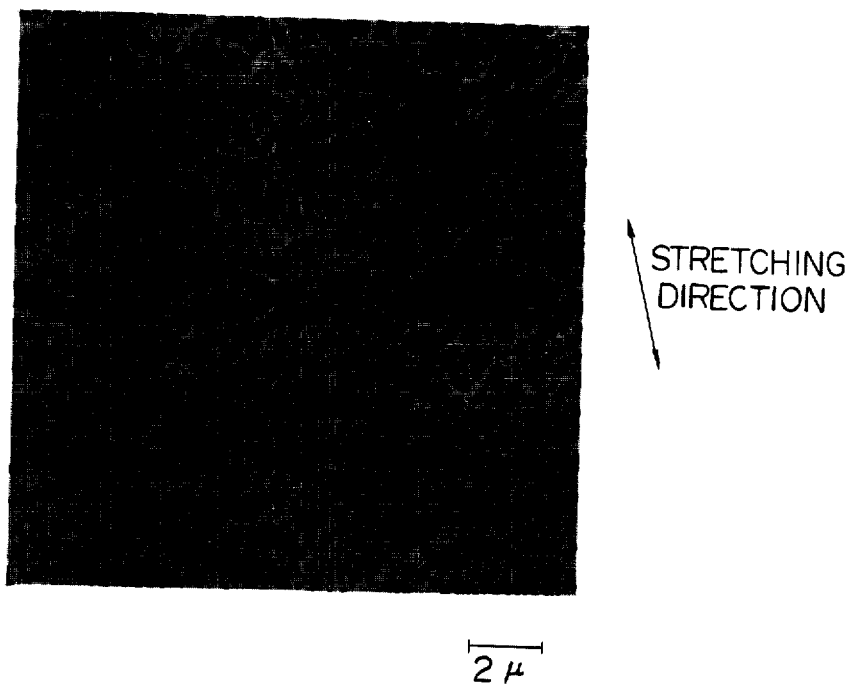
FIG. 2 is a scanning-type electron microphotograph of the surface of the porous polyethylene film of the present invention (magnification: 6000).

FIG. 1 is a schematic diagram illustrating strip-like micropores in the porous polyethylene film obtained according to the present invention. FIG. 2 is a surface scanning-type electron microphotograph (6000 times) of the film that was practically obtained.

In FIG. 1, reference numeral 1 denotes microfibrils that are oriented to the direction of film stretching, 2 denotes nodular portions coupled to the microfibrils 1 nearly at right angles thereto, 3 denotes strip-like micropores which are defined by microfibrils and nodular portions and which constitute a laminar structure via nodular portions, 4 denotes a portion which is arrayed nearly in parallel with the microfibrils and which is thicker than the microfibril. In the electron microphotograph, the portion 4 appears to be an aggregate of microfibrils. It is not obvious how the portion 4 is constructed. In this specification, however, the portion 4 is referred to as aggregate of microfibrils. In FIG. 1, the laminar structure refers to that micropores are laminated in a plane in the directions of length and width of the film, and the thus constructed planes are stacked in the direction of thickness of the film.

As mentioned above, the strip-like micropores of the porous film of the present invention are characterized by being formed by microfibrils and nodular portions. More close study of the porous film through an electron microscope indicates that the microfibrils 1 have an average thickness $\bar{d}_M$ of 0.01 to 0.5 micron, and an average length $\bar{l}_M$ of 0.1 to 3.0 microns, and the nodular portions 2 have an average length $\bar{l}_K$ of 0.05 to 1.0 micron in the stretching direction. It was further discovered that the distance between the neighboring microfibrils or the average width $\bar{d}_V$ of strip-like micropores lies over a range of 0.3 to 5.0 times the average thickness $\bar{d}_M$ of the microfibrils, and that the average length $\bar{l}_V$ of the strip-like micropores given in terms of a distance between the neighboring nodular portions lies over a range of 3 to 50 times the average width $\bar{d}_V$ of the strip-like micropores.

The porous polyethylene film of the present invention can be used as a clean separator film without treatment with solvent or plasticizer, and has a large porosity, a large gas permeability and a large liquid permeability. Furthermore, owing to the particular microporous laminar structure and the shape of the pores, the porous polyethylene film develops little loading. Therefore, the porous polyethylene film of the present invention is suited for:

separating blood plasma from the blood by filtration;
for fractionating blood plasma into various proteins;
for use as an aseptic/dust-free filter;
for use as a filter for treating sterilized water;
for use as a film for filtering a variety of solutions and waste liquors;
for use as a separator for batteries; and
for use as a film for electrophoresis.

When used in aqueous solutions, the hydrophobic property of the polyethylene does not necessarily become a problem. The hydrophobic property can be converted into a hydrophilic property by treating the polyethylene film with water containing alcohol or reversed soap, oxidizing the polyethylene film with ozone, grafting onto the polyethylene film a hydrophilic monomer such as acrylic acid, maleic anhydride or vinyl pyrrolidone, or by treating the polyethylene film according to any conventional physical means or chemical means. Therefore, the hydrophobic property of the polyethylene film does not at all impose problems.

The porous film of the present invention can be obtained by molding a high-density polyethylene which has a melt index (MI value) of 0.1 to 5 and a density of greater than 0.955 g/cc$^3$ using an ordinary film extruder at a temperature which is higher by about 20° C. or more than the melting point of the polymer but which does not exceed the melting point of the polymer by more than about 80° C. and at a draft ratio of 10 to 5000 to prepare a film, annealing, as required, the thus obtained crystalline unstretched film at a temperature lower than the melting point of the polymer, cold-stretching the film by 5 to 100% through a stretching section maintained at a temperature lower than 40° C., hot-stretching the film through one or a plurality of stretching stages at a temperature range of 80° to 125° C. in such a manner that the total stretching amount consisting of the cold-stretching and the hot-stretching lies within a range of 50 to 700%, and then, as required, thermally setting the film at a temperature of 100° to 125° C.

For such a process, it is essential to use a high-density polyethylene having small amount of branches and having a density of at least greater than 0.955 as measured by the method stipulated under ASTM D-1505.

It is found that use of a high-density polyethylene having a density of smaller than 0.955 or use of a low-density polyethylene makes it quite difficult to obtain the porous structure as in the present convention. Even when the porous structure is formed, the average porous diameter may be smaller than 0.05 micron. Furthermore, though the porosity may be great, the film may exhibit small water permeability presumably due to the fact that the film contains pores of an ink-bottle structure which do not completely penetrate through the film. The difference in the porous structure determined by the density of polymer makes the polymer structure and, especially, the amount of branches and the length of branches to be different to such a degree that those skilled in the art may consider that different polymers are employed. It is therefore, considered, that the above fact greatly affects the formation of porous structure.

The polyethylene which is preferably to be used in the present invention should have an MI value which lies within a value of 0.1 to 5. The MI value is measured in accordance with ASTM D-1238. Within the above-mentioned range, it is possible to obtain a porous film having a microporous laminar structure, an average porous diameter of 0.05 to 2 microns and a porosity of 30 to 90%. With the high-density polyethylene having an MI value of less than 0.1, the melt viscosity may be so high that it becomes difficult to stably mold the film. With the high-density polyethylene having an MI value of greater than 5, the film can be molded, but generally lacks stability when it is stretched. Thus, it becomes difficult to handle the film. Further, the film exhibits very poor properties.

According to the present invention, the above-mentioned high, density polyethylene can be molded using an ordinary film extruder to obtain a crystalline unstretched film. The dies may be either of a slit construction or a double tubular construction. When a slit-like die is used, there is formed a flat film and when a double tubular die is used, there is obtained a cylindrical film. The cylindrical film with folded state can be subjected to the heat treatment, stretching and thermosetting without the need of cutting it open into a flat film. In molding the film, furthermore, a desired width can be obtained by adjusting the amount of air blown into the tube.

The unstretched film for preparing a porous film having an average porous diameter of 0.05 to 2.0 micron and a porosity of 30 to 90%, according to the present invention, can be obtained by extrusion at a temperature which is higher by more than about 20° C. than the melting point of the polymer but which does not exceed the melting point of the polymer by more than 80° C. The unstretched film molded at temperatures that is not higher by more than about 20° C. than the melting point of the polymer will have been very highly oriented and crystallized. However, when the unstretched film is stretched to make it porous in accordance with the present invention, the maximum stretching ratio is small and it becomes difficult to obtain a porous film as contemplated by the present invention. On the other hand, when the film is molded at a temperature which is higher than the melting point of the polymer by more than 80° C., the film tends to lose the necessary properties, for example, losing the porosity, making it difficult to obtain a porous film having relatively large pore diameters contemplated by the present invention.

The polymer which is extruded at a suitable temperature should then be drawn at a draft ratio over a range of 10 to 5000. The drawn film from the dies preferably should be quickly quenched to a temperature of lower than about 70° C. on a roll to which the film comes into contact for the first time. For this purpose, it is recommended to blow the air to the film immediately after it is extruded, or to install any other cooling device.

The thus obtained unstretched film may directly be subjected to the stretching to make it porous, or may be stretched after it is annealed at a temperature of lower than the melting point of the polymer and preferably at a temperature lower than 120° C. under the condition of a constant length. An annealing performed for about 2 minutes will be sufficient.

The stretching should be effected in two stages while the film is being heated subsequent to the cold stretching, or the hot stretching should further be effected being divided into a plurality of stages; the cold stretching of a single stage only is usually not sufficient. To obtain a porous film having a microporous laminar structure, an average pore diameter of greater than 0.5 micron and a porosity of greater than 30% as contemplated by the present invention, it is usually essential that the temperature for effecting the cold stretching is lower than 40° C. and is preferably room temperature but higher than −100° C. To effect the above-mentioned cold stretching is a very important and indispensable requirement for preparing the porous polyethylene film having a microporous laminar structure and an average pore diameter of greater than 0.05 micron as contemplated by the present invention.

Thus, it is believed that in the highly oriented crystalline unstretched film, the crystalline structure is first destroyed in the step of cold stretching, whereby microcracks develop which then grow into a laminar structure of microvoids through the subsequent step of hot stretching which makes the film thermally plasticized. Therefore, the degree of uniformity of microcracks developed through the first step of cold stretching serves as an important technical point for determining film properties, uniformity of products and for stabilizing the manufacturing steps. That is, if the cold stretching is effected through a section which is as short as possible, the stretching point is fixed, the film is whitened very uniformly, a maximum stretching ratio is greatly increased in the subsequent step of hot stretching, and the microporous laminar structure is formed very conspicuously or, in other words, pores of large diameters are distributed sharply. Usually, the section for effecting the cold stretching should be shorter than 50 mm.

Thus, after the cold stretching of 5 to 100% is effected, the film is hot-stretched through a single stage or a plurality of stages at a temperature of 80° to 125° C. If the stretching is effected at a temperature in excess of 125° C., the film tends to become transparent and makes it quite difficult to obtain a porous structure. The hot stretching effected at a temperature lower than 80° C. is not necessarily inconvenient. However, the film property decreases with the decrease in the temperature of hot stretching; it becomes difficult to achieve a product according to the present invention. The stretching ratio in the hot stretching should be so selected that the total amount of stretching consisting of the cold stretching and the hot stretching lies within a range of 50 to 700%. If the total stretching ratio exceeds 700%, the film so often breaks during the step of stretching or the stability of the steps is determinedly affected.

According to the study conducted by the inventors of the present invention, film properties such as porosity and average diameter of the porous film can be changed to a considerable degree by changing the amounts of hot stretching and cold stretching, and by changing the ratio of hot stretching. The proper conditions can be suitably selected depending upon the applications where the porous film is used. In particular, by effecting the cold stretching uniformly, the total stretching ratio inclusive of the hot stretching can be increased to be greater than 300%. This makes it possible to obtain a porous film having large porosity and porous diameters.

The obtained porous film maintains a stable shape during the step of hot stretching, and does not necessarily require the step of thermosetting to stabilize the porous structure. The step of thermosetting, however, may be effected, as required, while keeping the stretched length or allowing some shrinkage at the same temperature region as that of the hot stretching.

The invention will be explained below in further detail by way of working examples. In the present invention, measurements are taken in accordance with the following methods:

(1) Density: Measured in accordance with ASTM D-1505 using a sample which had been heat-treated at 120° C. until the density has become constant.

(2) MI value: Measured in accordance with ASTM D-1238.

(3) Porosity and distribution of pore diameter: Measured using a mercury porosimeter, Model 221, manufactured by Carlo Erba Co.

(4) Elastic recovery factor: A specimen 15 mm wide and 2 inches long is placed in a tension tester under the conditions of a temperature of 25° C. and a relative humidity of 65%, and is stretched at a rate of 2 inches per minute until a stretching ratio of 50% is reached. The specimen is maintained in a stretched condition for 1 minute and is then relaxed at the same rate as that of the stretching. The read value is recorded when the tester indicates the no-load condition. Tensilon, Model UTM-II, manufactured by Toyo Bowldwin Co. is used as a tension tester. The elastic recovery factor is found from the following relation:

Elastic recovery factor =

-continued $$\frac{\begin{bmatrix} \text{Length at} \\ \text{50\% elongation} \end{bmatrix} - \begin{bmatrix} \text{Length when load is returned} \\ \text{to zero after 50\% elongation} \end{bmatrix}}{\begin{bmatrix} \text{Length at} \\ \text{50\% elongation} \end{bmatrix} - [\text{Length before stretched}]} \times$$

$$100 \, (\%)$$

(5) Amount of $N_2$ gas permeation: A sample having an effective film area of 20 cm$^2$ is prepared, and nitrogen is passed through the sample under the pressure of 380 mm Hg at 25° C. to measure the amount of nitrogen gas which has permeated.

(6) Amount of water permeation: Like the above-mentioned measurement of $N_2$ gas permeation, a sample having an effective film area of 20 cm$^2$ is prepared, immersed in a mixture solvent of ethanol and water (at a ratio of 75 to 25 by volume) for 30 minutes to make the specimen hydrophilic, and is then sufficiently washed with ion-exchanged water. Water under the pressure of 380 mm Hg is passed from one surface of the sample which has not been dried to measure unit amount of water that has penetrated into another surface of the sample.

(7) Surface area: Surface area of the unit weight of a hollow fiber membrane, A (m$^2$/g), was measured by nitrogen adsorption method. The value of A is converted to the value of B (m$^2$/cm$^3$), i.e. surface area of the unit volume of the membrane by the following equation:

$$B = (1-\epsilon) \times \rho \times A$$

where $\epsilon$ is a porosity and $\rho$ is a polymer density.

EXAMPLE 1.

A high-density polyethylene (Hi-zex 5202B, a product of Mitsui Petrochemical Co.) having a density of 0.964 g/cm$^3$ and a melt index of 0.35 was melt-extruded at 170° C. using dies of a double tubular construction having a diameter of blow port of 50 mm and a width of annular slit of 0.7 mm. The air was blown into the thus molded tubular film such that the diameter thereof became equal to the diameter of the dies. The cooling air of a temperature of 25° C. was blown onto the whole surface of the tubular film at a position 10 cm above the dies to cool it, and was taken up on a nip roll at a position 100 cm above the dies at a speed of 25 meters per minute. The draft ratio at this time was 175. The obtained unstretched film possessed a thickness of 25 microns.

The unstretched film having a tubular shape was folded and passed over a roller heated at 110° C. maintaining a constant length, and was annealed under the condition in which the film was brought into contact with the roller for 150 seconds. The annealed film was cold-stretched by 30% between the nip rolls maintained at room temperature. The distance between the nip rolls was 35 mm, and the speed of the nip roll on the supply side was 2 meters per minute. Subsequent to the cold-stretching, the film was hot-stretched between the rollers in a box heated at 110° C. until the total stretching amount was 350%, and was then thermally set in a box heated at 110° C. for 20 seconds to prepare continuously a porous film. The thus obtained porous polyethylene film possessed a thickness of 20 microns, an elastic recovery factor of 20%, and exhibited very uniform degree of whitening. The average pore diameter was 0.57 micron as measured using a mercury porosimeter, the porosity was 68%, and the porous surface area was 28 m$^2$/g (8.6 m$^2$/cm$^3$). The amount of $N_2$ gas permeation was $2.65 \times 10^5$ l/m$^2$.hr, 760 mm Hg, and the amount of water permeation was 4300 l/m$^2$.hr, 760 mm Hg. The average length $\bar{1}_M$ of microfibrils of the porous polyethylene film was about 1.0 micron, the average thickness $\bar{d}_M$ of microfibrils was about 0.1 micron, and the average length $\bar{1}_K$ of the nodular portions in the stretched direction was 0.5 micron, as measured relying upon the electron microphotograph. Further, the average width $\bar{d}_V$ of micropores was 0.1 micron, and a ratio of the length to the width of the micropores was about 10.

COMPARATIVE EXAMPLES 1 AND 2

It was attempted to prepare porous polyethylene films in the same manner as the above Example 1 using a high-density polyethylene (Hi-zex 1300J, a product of Mitsui Petrochemical Co.) having a density of 0.965 g/cm$^3$ and a melt index of 14, and using a medium-density polyethylene (Hi-zex 5500B, a product of Mitsui Petrochemical Co.) having a density of 0.942 g/cm$^3$ and a melt index of 0.60. In the case of the Hi-zex 1300J, however, white spots developed conspicuously in the film when it was stretched. In the case of the Hi-zex 5500B, on the other hand, the porosity was smaller than 10%. In neither case was it possible to obtain practicable porous films.

EXAMPLES 2 TO 8

Tubular films were obtained by melt-extruding high-density polyethylenes having the same density as that of Example 1 but having different MI values, using the same annular dies as that of Example 1. Using the same apparatus as that of Example 1, the films were annealed, stretched (first stretching) at room temperature, stretched (second stretching) at 110° C., and was finally thermally set at 110° C. for 20 seconds. Table 1 shows film-forming conditions together with those of Example 1 and Comparative Examples 1, 2. Conditions which are not shown in Table 1 were the same as those mentioned in Example 1. Table 2 shows properties and pore shapes of the obtained porous films together with those of Example 1 and Comparative Examples 1, 2.

TABLE 1

| Example No. | Polymer Density (g/cm$^3$) | MI value | Extrusion Temp. (°C.) | Take-up speed (m/min) | Draft ratio | Thickness of unstretched film (μ) | Annealing time (Note 1) (sec) | Cold-stretching ratio (Note 2) (%) | Total stretching ratio (Note 3) |
|---|---|---|---|---|---|---|---|---|---|
| 1 | 0.964 | 0.35 | 170 | 25 | 175 | 25 | 150 | 30 | 350 |
| 2 | " | 0.75 | 160 | " | " | " | " | " | " |
| 3 | " | 0.75 | 160 | " | " | " | " | 50 | " |
| 4 | " | 0.35 | 170 | " | " | " | " | 30 | 150 |
| 5 | " | " | " | " | " | " | " | " | 250 |
| 6 | " | " | " | " | " | " | " | " | 450 |
| 7 | " | " | " | 10 | 70 | 58 | 200 | 60 | 350 |

TABLE 1-continued

| Example No. | Polymer Density (g/cm³) | MI value | Extrusion Temp. (°C.) | Take-up speed (m/min) | Draft ratio | Thickness of unstretched film (μ) | Annealing time (Note 1) (sec) | Cold-stretching ratio (Note 2) (%) | Total stretching ratio (Note 3) |
|---|---|---|---|---|---|---|---|---|---|
| 8 | " | " | " | 40 | 280 | 17 | 200 | 25 | 200 |
| Comparative Example 1 | 0.965 | 14.0 | " | 25 | 175 | 25 | 150 | white spots developed | |
| Comparative Example 2 | 0.942 | 0.60 | "25 | 175 | 25 | 150 | 30 | 350 | |

(Note 1) Annealing temperature was 110° C.
(Note 2) Distance between the stretching rolls was 35 mm and stretching temperature was room temperature
(Note 3) Hot stretching temperature was 110° C.

TABLE 2

| Example No. | Film thickness (μ) | Elastic recovery factor (%) | Average pore diameter (μ) | Porosity (%) | Pore surface area (m²/cm³) | Amount of N₂ gas permeation $\left(\frac{1}{m^2, hr, atm}\right)$ | Amount of water permeation $\left(\frac{1}{m^2, hr, atm}\right)$ | Pore Shape $\bar{l}_m$ (μ) | $\bar{d}_m$ (μ) | $\bar{l}_k$ (μ) | $\bar{d}_v$ (μ) | $\bar{l}_v/\bar{d}_v$ |
|---|---|---|---|---|---|---|---|---|---|---|---|---|
| 1 | 20 | 20 | 0.57 | 68 | 8.6 | $2.65 \times 10^5$ | $4.3 \times 10^3$ | 1.0 | 0.10 | 0.5 | 0.1 | 10 |
| 2 | 20 | 20 | 0.55 | 66 | 8.8 | $2.35 \times 10^5$ | $4.2 \times 10^3$ | 1.0 | 0.10 | 0.5 | 0.08 | 12.5 |
| 3 | 20 | 25 | 0.46 | 65 | 10.8 | $2.12 \times 10^5$ | $4.0 \times 10^3$ | 0.7 | 0.12 | 0.6 | 0.09 | 8.9 |
| 4 | 22 | 37 | 0.15 | 42 | 9.5 | $1.35 \times 10^5$ | $1.1 \times 10^3$ | 0.9 | 0.11 | 2.1 | 0.11 | 5.0 |
| 5 | 21 | 31 | 0.34 | 55 | 9.1 | $1.76 \times 10^5$ | $2.8 \times 10^3$ | 1.3 | 0.08 | 0.5 | 0.08 | 9.2 |
| 6 | 18 | 18 | 0.60 | 71 | 10.1 | $2.88 \times 10^5$ | $5.3 \times 10^3$ | 1.7 | 0.10 | 0.7 | 0.25 | 4.8 |
| 7 | 43 | 33 | 0.48 | 64 | 10.4 | $2.03 \times 10^5$ | $3.0 \times 10^3$ | 1.1 | 0.15 | 0.8 | 0.10 | 9.7 |
| 8 | 10 | 28 | 0.30 | 52 | 8.8 | $1.52 \times 10^5$ | $1.9 \times 10^3$ | 0.8 | 0.07 | 1.3 | 0.07 | 8.0 |
| Comparative example 1 | — | — | — | — | — | — | — | — | — | — | — | — |
| Comparative example 2 | — | — | — | — | 10 or less | — | — | — | — | — | — | — |

We claim:

1. A porous polyethylene film comprising a series of microfibrils arrayed along the length of the film, a series of nodules disposed at substantially right angles to said microfibrils across the width of the film, said microfibrils and nodules defining micropores having an average pore diameter of 0.05 to 2 microns as measured by a mercury porosimeter, said microfibrils and nodules forming laminated strips wherein the micropores in said strips are contiguous with one another to provide pores extending from the surface of the film to the other, said film having a porosity of 30 to 90% and an elastic recovery factor from the 50% stretching ratio is less than 50%.

2. A porous polyethylene film according to claim 1, wherein the surface area is less than 30 m²/cm³.

3. A porous polyethylene film according to claim 1, wherein an average pore diameter of said micropores is greater than 0.5 micron.

4. A porous polyethylene film according to claim 1, wherein:

(1) an average thickness ($\bar{d}_M$) and an average length ($\bar{l}_M$) of the microfibrils are given by:
$\bar{d}_M$ = 0.01 to 0.5 micron
$\bar{l}_M$ = 0.1 to 3.0 microns (2) an average length ($\bar{l}_K$) of a modular portion comprising a group of micropores measured along the length of the film is given by
$\bar{l}_K$ = 0.05 to 1.0 micron (3) an average width ($\bar{d}_V$) and an average length ($\bar{l}_V$) of the micropores are given by:

$\bar{d}_V \quad d_M$ = 0.3 to 5.0

$\bar{l}_V \quad d_V$ = 3 to 50.

5. A process for the manufacture of a porous polyethylene film comprising molding a high-density polyethylene which has a melt index (MI value) of 0.1 to 5 and a density of greater than 0.955 g/cc³ in a film extruder at a temperature which is higher by at least 20° C. than the melting point of the polymer but which does not exceed the melting point of the polymer by more than 80° C. and at a draft ratio of 10 to 5000 to prepare a film, annealing, as required, the thus obtained crystalline unstretched film at a temperature lower than the melting point of the polymer, cold-stretching the film by 5 to 100% through a stretching section maintained at a temperature lower than 40° C., hot-stretching the film through at least one stretching stage at a temperature range of 80° to 125° C., the total stretching in the cold-stretching and the hot-stretching stages being from 50 to 700%, and then, as required, thermally setting the film at a temperature of 100° to 125° C.

* * * * *